United States Patent
Satish et al.

(10) Patent No.: US 9,614,911 B2
(45) Date of Patent: Apr. 4, 2017

(54) METHODS AND SYSTEMS FOR STORAGE ACCESS MANAGEMENT

(71) Applicant: NETAPP, INC., Sunnyvale, CA (US)

(72) Inventors: Sanjyoth Nandagudi Satish, Bangalore (IN); Venu Madhava Gunda, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 266 days.

(21) Appl. No.: 14/516,983

(22) Filed: Oct. 17, 2014

(65) Prior Publication Data

US 2016/0112343 A1 Apr. 21, 2016

(51) Int. Cl.
*G06F 15/16* (2006.01)
*H04L 29/08* (2006.01)
*G06F 3/06* (2006.01)

(52) U.S. Cl.
CPC .......... *H04L 67/1097* (2013.01); *G06F 3/06* (2013.01)

(58) Field of Classification Search
CPC .............. H04L 67/109; H04L 67/1097; G06F 11/2069; G06F 3/06
See application file for complete search history.

(56) References Cited

U.S. PATENT DOCUMENTS

| | | | | |
|---|---|---|---|---|
| 7,711,978 B1* | 5/2010 | Roy | ...................... | G06F 11/201 714/43 |
| 2004/0049572 A1* | 3/2004 | Yamamoto | ........ | G06F 17/30067 709/224 |
| 2015/0331733 A1* | 11/2015 | Channagiri | ......... | G06F 11/3688 714/33 |

* cited by examiner

*Primary Examiner* — Mohamed Wasel
(74) *Attorney, Agent, or Firm* — Klein, O'Neill & Singh, LLP (57) ABSTRACT

Systems and methods for identifying and correcting storage system inefficiencies are provided. One method includes discovering Logical Unit Number (LUN) information from a network storage system node, the LUN information associated with a first LUN and including an initiator group (IGroup) associated with the first LUN; discovering node information. The node information includes logical interface (LIF) status information. The method includes determining whether LUN access information also comprises a port set associated with the IGroup; combining the LIF status information and the initiator access list of the IGroup to test accessibility of the first LUN, when a port set is not associated with the at least one IGroup; and combining the LIF status information, the initiator access list of the IGroup, and the LIF access list of the port set to test the accessibility of the first LUN, when there is a port set associated with the IGroup.

21 Claims, 10 Drawing Sheets

METHODS AND SYSTEMS FOR STORAGE ACCESS MANAGEMENT

TECHNICAL FIELD

The present disclosure relates to storage systems and, more particularly, to assisting storage system users in identifying and correcting storage access issues.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

The storage operating system stores and manages these shared data containers for a large number of clients, each of whom will have its own set of access rights and restrictions. As such, it is important to maintain separate access capabilities for different clients or sets of clients, but at the same time, it is helpful to ensure that the clients are able to store and retrieve data in an efficient manner. With the ever increasing size of storage systems, storage system managers are challenged to provide efficient storage access to larger and larger numbers of clients/connected devices. As such, it is useful to provide increasingly intelligent systems to aid storage system managers in their tasks.

SUMMARY

In one aspect, a machine implemented method is provided. The method includes discovering Logical Unit Number (LUN) information from a storage system node, the LUN information associated with a first LUN and including an initiator group (IGroup) associated with the first LUN, where the IGroup identifies an initiator that can access the first LUN; and discovering node information including logical interface (LIF) status information, where a LIF is used by a client system to access the first LUN.

The method further includes determining whether LUN access information also comprises a port set associated with the IGroup, where the port set limits access to the first LUN using a specific LIF; combining the LIF status information and initiator information to test accessibility of the first LUN, when a port set is not associated to the at least one IGroup; combining the LIF status information, the initiator information, and an LIF access list of the port set to test accessibility of the first LUN, when a port set is associated with the IGroup; and triggering an event when accessibility of the first LUN is deficient.

In another aspect, a non-transitory, machine readable storage medium having stored thereon instructions for performing a method is provided. The machine executable code which when executed by at least one machine, causes the machine to: discover Logical Unit Number (LUN) information from a storage system node, the LUN information associated with a first LUN and including an initiator group (IGroup) associated with the first LUN, where the IGroup identifies an initiator that can access the first LUN; discover node information including logical interface (LIF) status information, where a LIF is used by a client system to access the first LUN; determine whether LUN access information also comprises a port set associated with the IGroup, where the port set limits access to the first LUN using a specific LIF; combine the LIF status information and initiator information to test accessibility of the first LUN, when a port set is not associated with the at least one IGroup; combine the LIF status information, the initiator information, and an LIF access list of the port set to test accessibility of the first LUN, when a port set is associated with the IGroup; and trigger an event when accessibility of the first LUN is deficient.

In yet another aspect, a system having a memory with machine readable medium comprising machine executable code having stored thereon instructions is provided. A processor module coupled to the memory is configured to execute the machine executable code to: discover Logical Unit Number (LUN) information from a storage system node, the LUN information associated with a first LUN and including an initiator group (IGroup) associated with the first LUN, where the IGroup identifies an initiator that can access the first LUN; discover node information including logical interface (LIF) status information; where a LIF is used by a client system to access the first LUN; determine whether LUN access information also comprises a port set associated with the IGroup, where the port set limits access to the first LUN using a specific LIF; combine the LIF status information and initiator information to test accessibility of the first LUN, when a port set is not associated with the at least one IGroup; combine the LIF status information, the initiator information, and an LIF access list of the port set to test accessibility of the first LUN, when a port set is associated with the IGroup; and trigger an event when accessibility of the first LUN is deficient.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Systems and methods for identifying and correcting storage system inefficiencies are disclosed. Logical Unit Number (LUN) information is discovered from a network storage system node. The LUN information is associated with a first LUN and including an initiator group (IGroup) associated with the first LUN. The method includes discovering node information that includes logical interface (LIF) status information; determining whether LUN access information also comprises a port set associated with the IGroup; combining the LIF status information and the initiator access list of the IGroup to test accessibility of the first LUN, when a port set is not associated with the at least one IGroup; and combining the LIF status information, the initiator access list of the IGroup, and the LIF access list of the port set to test accessibility of the first LUN, when there is a port set associated with the IGroup.

Figure 1A:
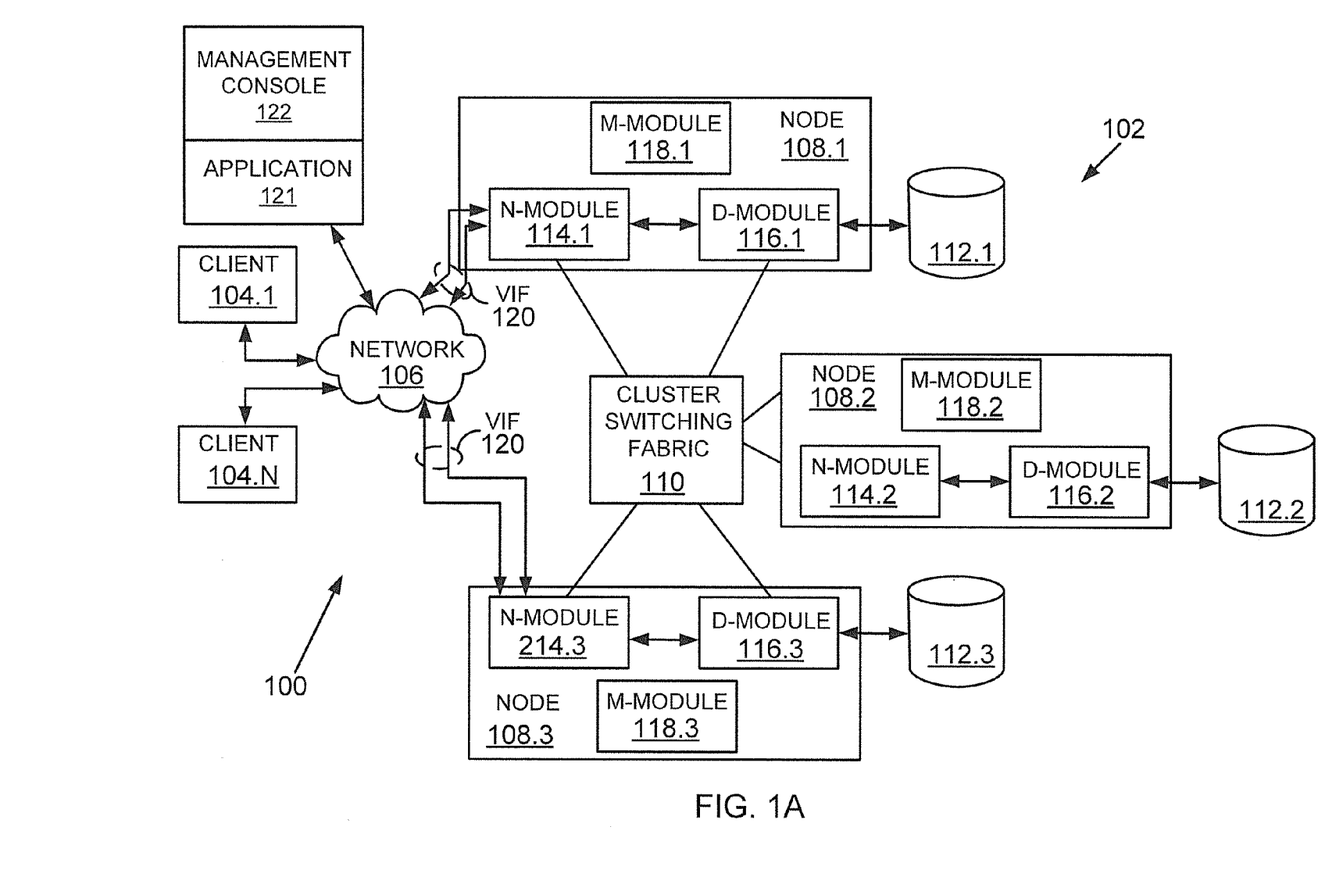
FIG. 1A shows an example of an operating environment for the various aspects disclosed herein.

Clustered System:

FIG. 1A shows an example of a cluster based storage environment 100 having a plurality of nodes 108.1-108.3 where the various aspects disclosed herein can be implemented. Storage environment 100 may include a plurality of client computing systems (also referred to as a client system or client) 104.1-104.N, a clustered storage system 102 and at least a network 106 communicably connecting the client systems 104.1-104.N and the clustered storage system 102.

The clustered system 102 includes a plurality of nodes 108.1-108.3 executing a plurality of modules, a cluster switching fabric 110, and a plurality of mass storage devices 112.1-112.3 (may be also be referred to as 112). The mass storage devices 112 may include writable storage device media such as magnetic disks, video tape, optical, DVD, magnetic tape, non-volatile memory devices for example, self-encrypting drives, flash memory devices and any other similar media adapted to store information. The storage devices 112 may be organized as one or more groups of Redundant Array of Independent (or Inexpensive) Disks (RAID). The aspects disclosed are not limited to any particular storage device or storage device configuration.

The storage system 102 provides a set of storage volumes to clients for storing information at storage devices 112. A storage operating system executed by the nodes of storage system 102 present or export data stored at storage devices 112 as a volume, or one or more qtree sub-volume units. Each volume may be configured to store data files (or data containers or data objects), scripts, word processing documents, executable programs, and any other type of structured or unstructured data. From the perspective of client systems, each volume can appear to be a single storage drive. However, each volume can represent the storage space in at one storage device, an aggregate of some or all of the storage space in multiple storage devices, a RAID group, or any other suitable set of storage space.

The storage system 102 may be used to store and manage information at storage devices 112 based on a client request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

Each of the plurality of nodes 108.1-108.3 is configured to include an N-module, a D-module, and an M-Module, each of which can be implemented as a processor executable module. For example, node 108.1 includes N-module 114.1, D-module 116.1, and M-Module 118.1, node 108.2 includes N-module 114.2, D-module 116.2, and M-Module 118.2, and node 108.3 includes N-module 114.3, D-module 116.3, and M-Module 118.3.

The N-modules 114.1-114.3 include functionality that enable the respective nodes 108.1-108.3 to connect to one or more of the client systems 104.1-104.N over network 106 and with other nodes via switching fabric 110. The D-modules 116.1-116.3 connect to one or more of the storage devices 112.1-112.3. The M-Modules 118.1-118.3 provide management functions for the clustered storage system 102.

A switched virtualization layer including a plurality of virtual interfaces (VIFs) 120 is provided to interface between the respective N-modules 114.1-114.3 and the client systems 104.1-104.N, allowing storage 112.1-112.3 associated with the nodes 108.1-108.3 to be presented to the client systems 104.1-104.N as a single shared storage pool.

In one aspect, the clustered storage system 102 can be organized into any suitable number of virtual servers (may also be referred to as "Vservers" or virtual storage machines). A Vserver is a virtual representation of a physical storage controller/system and is presented to a client system for storing information at storage devices 112. Each Vserver represents a single storage system namespace with independent network access. Each Vserver has a user domain and a security domain that are separate from the user and security domains of other Vservers. Moreover, each Vserver is associated with one or more VIFs 120 and can span one or more physical nodes, each of which can hold one or more VIFs 120 and storage associated with one or more Vservers. Client systems can access the data on a Vserver from any node of the clustered system through the VIFs associated with that Vserver.

Each of the nodes 108.1-108.3 is defined as a computing system to provide application services to one or more of the client systems 104.1-104.N. The nodes 108.1-108.3 are interconnected by the switching fabric 110, which, for example, may be embodied as a switch or any other type of connecting device.

Although FIG. 1A depicts an equal number (i.e., 3) of the N-modules 114.1-114.3, the D-modules 116.1-116.3, and the M-Modules 118.1-118.3, any other suitable number of N-modules, D-modules, and M-Modules may be provided. There may also be different numbers of N-modules, D-modules, and/or M-Modules within the clustered storage system 102. For example, in alternative aspects, the clustered storage system 102 may include a plurality of N-modules and a plurality of D-modules interconnected in a configuration that does not reflect a one-to-one correspondence between the N-modules and D-modules.

Each client system may request the services of one of the respective nodes 108.1, 108.2, 108.3, and that node may return the results of the services requested by the client system by exchanging packets over the computer network 106, which may be wire-based, optical fiber, wireless, or any other suitable combination thereof. The client systems may issue packets according to file-based access protocols, such as the NFS or CIFS protocol, when accessing information in the form of files and directories.

System 100 also includes a management console 122 executing a management application 121 out of a memory. Management console 122 may be used to configure and manage various elements of system 100, as described below in detail.

Figure 1B:
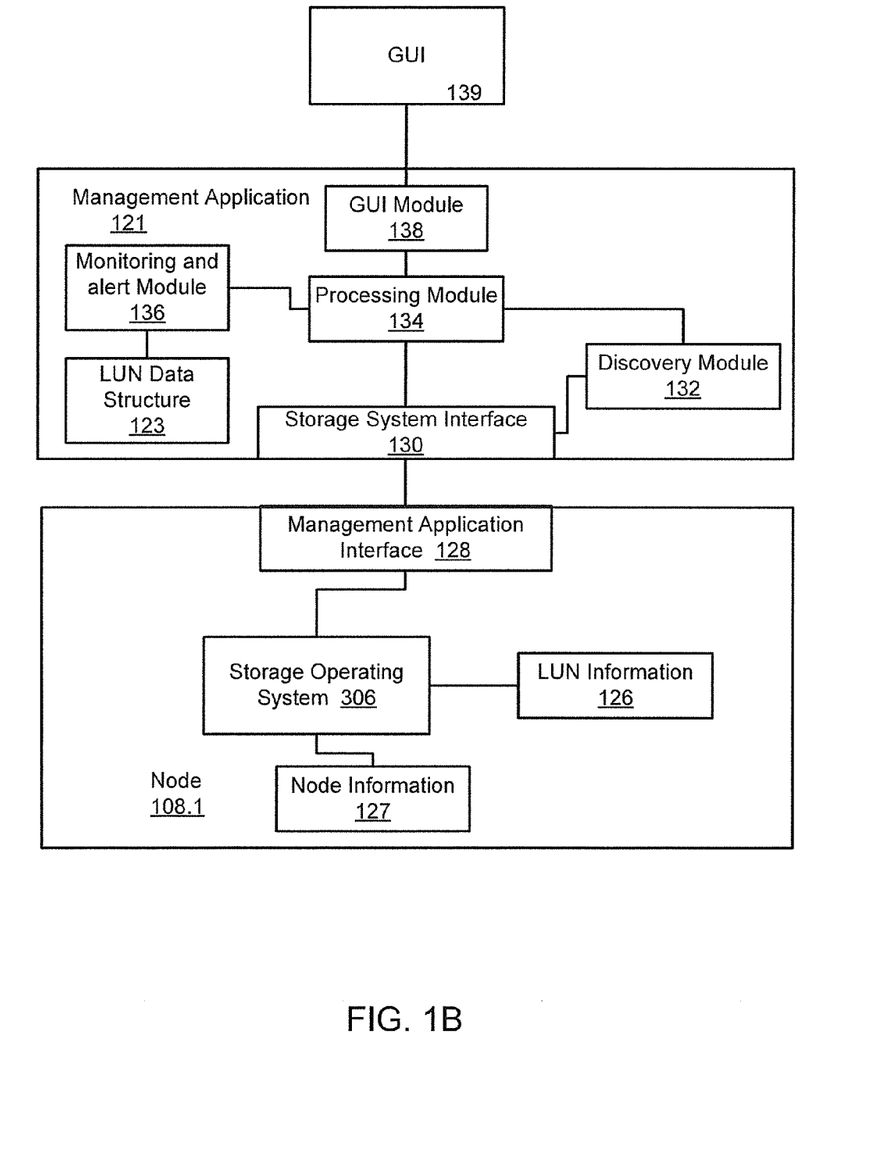
FIG. 1B shows a block diagram of a management application in communication with a storage node according to one aspect of the present disclosure.

Management Application 121:

FIG. 1B illustrates a block diagram of a management application 121 and associated modules executed by management console 122, in one aspect. In one aspect, the illustrated blocks are processor executable modules that can be run on hardware as described below with reference to FIG. 7. However, one of skilled in the art will understand that elements of FIG. 1B may be implemented in hardware, software or combination thereof in various combinations.

Management application 121 may be used by IT and data storage managers, particularly as storage systems get more and more complex. In one aspect according to the present disclosure, management application 121 interacts with storage system nodes, such as node 108.1, through network 106 (see FIG. 1A). In one aspect, the node 108.1 includes a storage operating system 306 (as described in more detail with respect to FIG. 6) which maintains LUN information 126 and node information 127.

In one aspect, LUN information 126 includes client information, Vserver information, initiator group (IGroup) information, port set information, and/or logical interface (LIF) information. A LIF is a logical interface (for example, an IP address) that connects a Vserver to a physical port (for example, of a node 108 described above). In one aspect, a LIF belongs to one Vserver, while a Vserver may include multiple LIFs, even on the same port. A port set includes one or more LIFs and may be used to limit access to specific LUNs. An IGroup includes one or more initiators that may generate input/output (I/O) requests to read and/or write data from a storage device. As an example, an IGroup represents one or more host bus adapters and/or software initiators and may be identified by Fibre Channel (FC) protocol host world-wide port names (WWPNs) and/or iSCSI host node names. When an IGroup has been defined, it can be mapped to LUNs to provide control over which initiators have access to those LUNs. When a port set is bound to an IGroup, the initiator members of that group are only able to access a LUN through LIFs that are members of the port set.

Additionally, storage operating system 306 has access to or maintains node information 127, which for example, provides indications of status for a node (for example, 108.1). According to one aspect, node information 127 may include information identifying LIFs that it controls and status indicators for those LIFs. In an embodiment, the status indicators may be binary values indicating that a particular LIF attribute is up or down, on or off, supported or not supported, or the like.

The storage operating system 306 communicates with management application 121 via a management application interface module 128, which is used to process communications to and from management application 121, through network 106. The management application 121 communicates with storage operating system 306 via a storage interface 130.

Management application 121 includes a processing module 134, which communicates with and coordinates operations of other modules of the management application 121. Specifically, these other modules may include, in one aspect, a discovery module 132, a monitoring and alert module 136, and a Graphic User Interface (GUI) module 138. The GUI module 138 provides a GUI 139 on a monitor or other display for interaction with the IT user or storage system manager. It may further accept input from the IT user or storage system manager for processing by the processing module 134. The discovery module 132 communicates with the storage operating system 306 to retrieve LUN information 126 and node information 127, such as for display in GUI 139 and use by a monitoring and alert module 136 described below in detail.

Figure 1C:
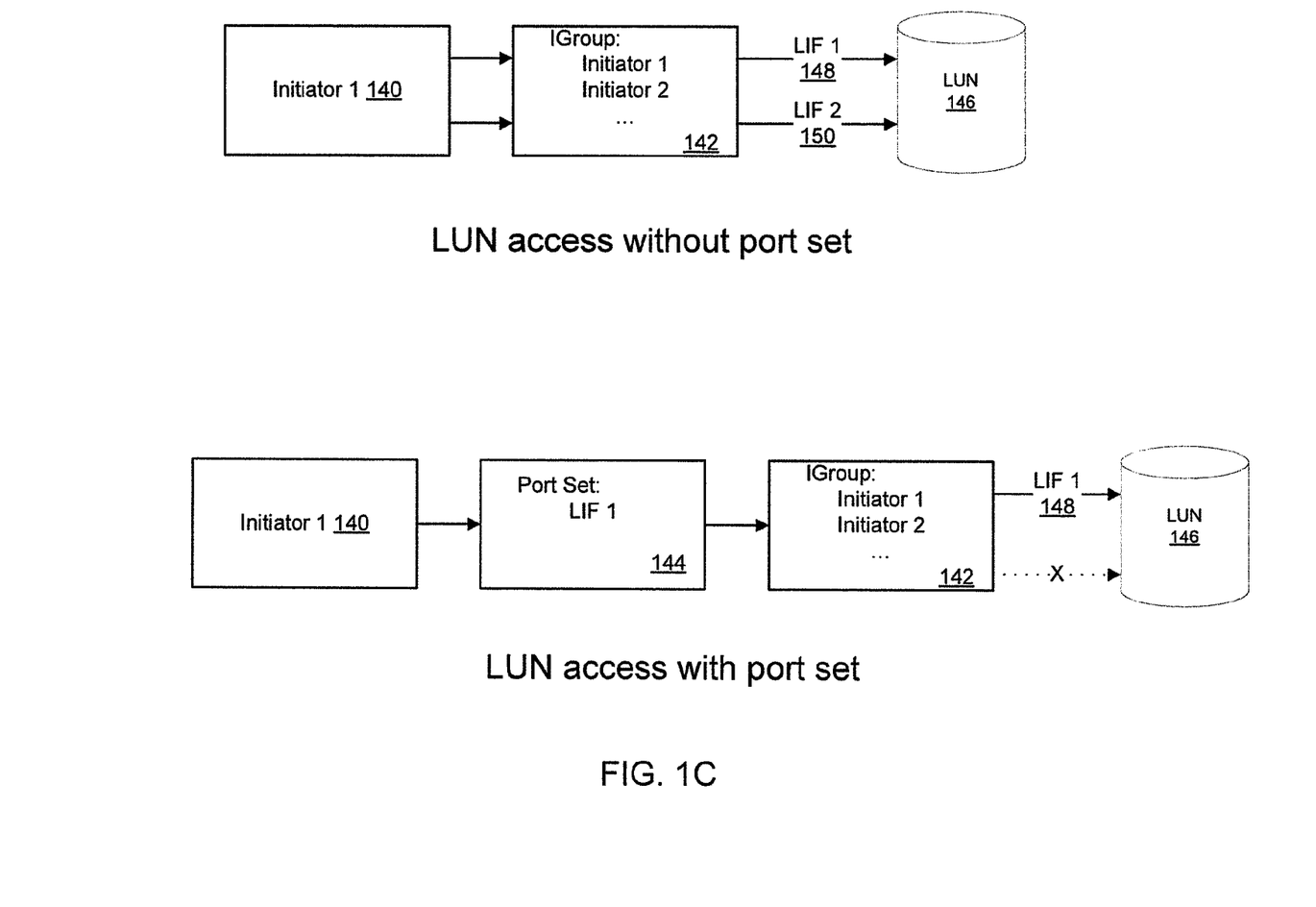
FIG. 1C illustrates logical unit number (LUN) access with and without port sets according to one aspect of the present disclosure.
Figure 1D:
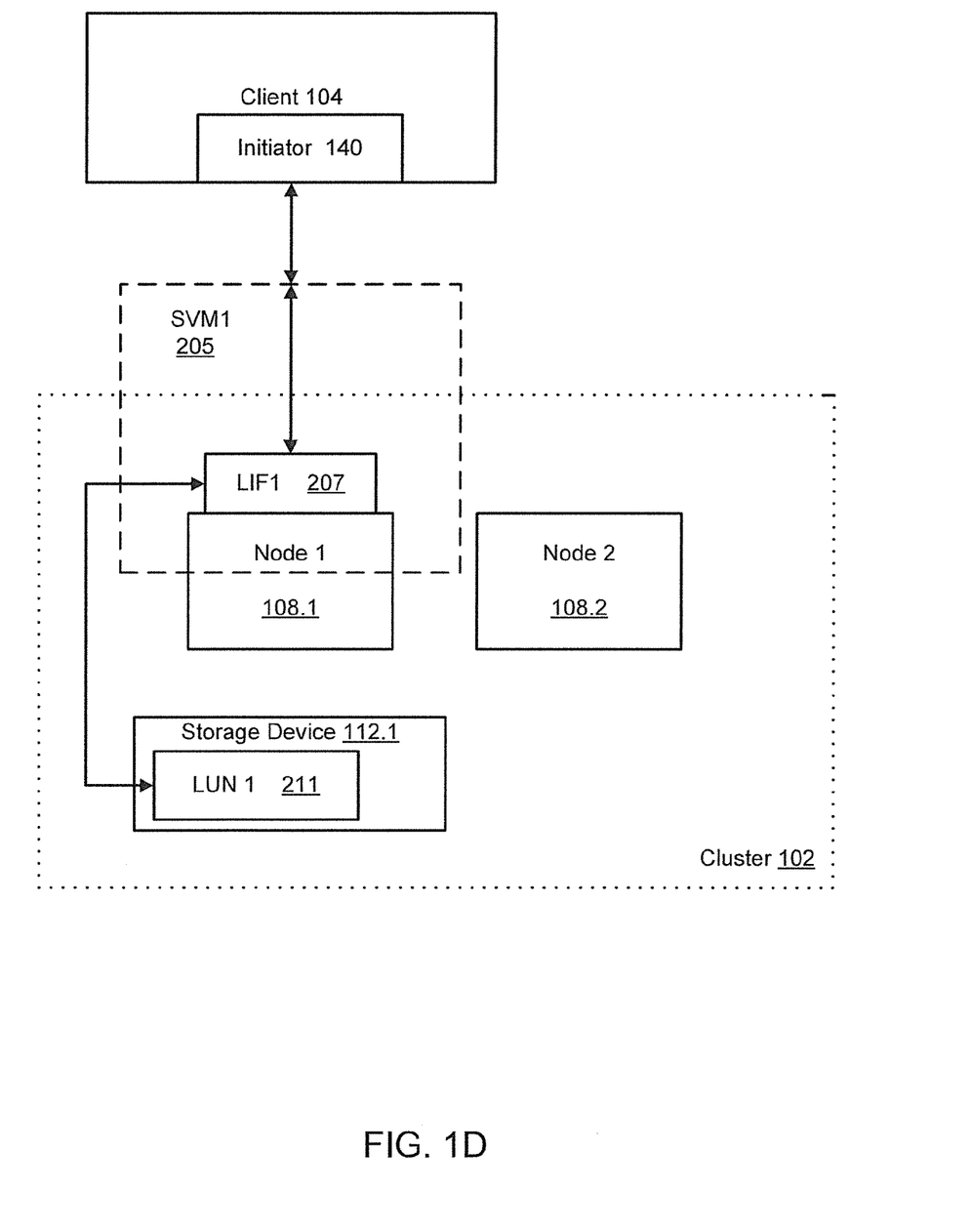
FIG. 1D shows a block diagram of a client system accessing a storage device.
Figure 1E:
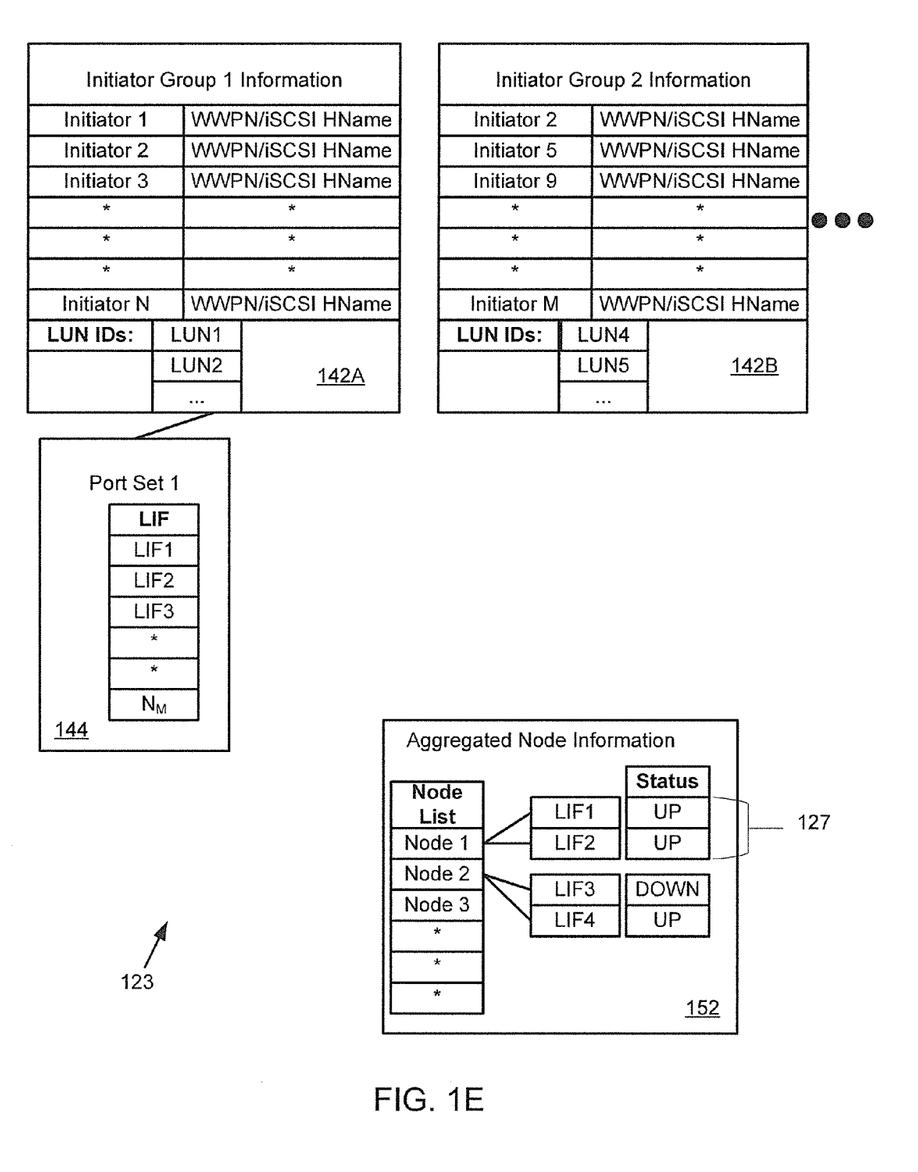
FIG. 1E illustrates an example of a data structure generated and used according to one aspect of the present disclosure.

In one aspect, the discovery module 132 gathers LUN information 126 and node information 127 from multiple nodes 108*n* and provides the information to the monitoring and alert module 136, which processes and aggregates the LUN information and node information to create a LUN data structure 123 (described in more detail with respect to FIG. 1E). The monitoring and alert module 136 then uses the LUN data structure 123 to determine if there are any deficiencies in the settings or operation of the system.

Monitoring and alert module 136 may also issue alerts to the user through the GUI 139 when there are problems with storage system configurations. In one aspect, the GUI module 138 may comprise a web browser for viewing data delivered to, or by, discovery module 132 or monitoring and alert module 136 as a URL, html file, or the like. In one aspect, discovery module 132 polls nodes for updated or revised LUN information and node information so that the monitoring and alert module can update the LUN data structure 123. In one aspect, discovery module polling may occur at predefined or user configured intervals; when system resources are under-utilized; upon system triggers (such as processing module 134 determining that a user has changed configuration settings, for example); and combinations of the same. In yet another aspect, information is passed through to the GUI module 138.

It should be further noted that in some aspects information may be presented through a command line interface (CLI)

and/or through various visual or non-visual means. For example, information may be presented to a user aurally and/or visually.

FIG. 1C illustrates two manners of accessing a LUN—for example, one where there is no port set configured and one where there is a port set configured. As set forth briefly above, an IGroup can be used to control what initiators have access to various LUNs. As shown, Initiator 1 140 is a member of IGroup 142 which has access to LUN 146 through LIF 1 148 and LIF 2 150. As such, Initiator 1 140 can access LUN 146 through either LIF1 148 or LIF2 150. However, when a port set 144 is configured and bound to IGroup 142, Initiator 1 140 is more controlled in how it can access a LUN 146. For example, as shown, when Initiator 1 140 attempts to access LUN 146, IGroup 1 142 and port set 144 indicate that it has access to LUN 146, but only through LIF 1 148 and not through a second LIF.

FIG. 1D provides another illustration of a client 104 accessing a LUN1 211 based on storage space at storage device 112.1. In one aspect, cluster 102 includes node1 108.1 and node2 108.2 and a storage device 112.1. Based on storage space at storage device 112.1, LUN1 211 is presented to client 104. Vserver 205 (or Storage Virtual Machine ("SVM")) is presented to a client 104. Client 104 includes an initiator 140 that communicates with Vserver 205 in order to read or write data from LUN 1 211. Vserver 205 is assigned LIF1 207 to connect to a physical port or virtual port of Node 108.1, which in turn provides access to LUN 1 211 of the storage device 112.1. Thereby a path is created for input/output (I/O) requests between the client 104 and LUN 1 211.

In storage systems as described, there are various settings and component interactions that have to be managed to provide proper data access and segregation. In general, management application 121 provides system administrators with a way to interact with the storage system 100, and add, remove, and configure various components, including, but not limited to, nodes, Vservers, LUNs, LIFs, and the like. More particularly, monitoring and alert module 136 collects and analyzes information from various components to help a system administrator more readily identify non-optimized system settings and operations, so that the system administrator can identify issues and update system settings to provide a more optimal operation. A more detailed description of processes handled by monitoring and alert module 136, in one aspect, are described below with respect to FIGS. 1E, 2, 3A-C, and 4A-C.

LUN Data Structure 123:

FIG. 1E illustrates LUN data structure 123 that is generated by monitoring and alert module 136, based on LUN information 126 that is collected from the storage operating system 306 in one aspect. This information may come from, for example, LUN information 126 and node information 127 of various nodes 108.N (see FIGS. 1A, 1B).

As shown, LUN data structure 123 includes IGroup information 142A-B . . . and port set information 144. The IGroup information identifies an IGroup. When an IGroup has been defined, it can be mapped to LUNs that are identified by unique LUN IDs to provide control over which initiator can access specific LUNs. As shown, IGroup 1 (142A) includes initiators 1, 2, and 3, and may be mapped to LUN1 and LUN2. IGroup 2 (142B) may include initiators 2, 5, and 9 that may be mapped to LUN4 and LUN5.

In one aspect, initiators may be included in multiple IGroups, but may not be mapped to the same LUN in different IGroups. In one aspect, an initiator may not be a member of IGroups of host systems with differing operating system (OS) types. As illustrated in FIG. 1E, in such one aspect, IGroup 1 and IGroup2 would be of the same OS type, because they share initiator 2.

LUN data structure 123 may further include port set information 144, where a port set includes a list of LIFs that may be used to access LUNs. The LIFs or associated information may also identify the node with which the LIF is associated. The port set may also indicate to which IGroup it is bound. In FIG. 1E, port set 1 is bound to IGroup 1.

In one aspect, LUN data structure 123 further includes node information 152, which may identify the nodes (108) of a cluster (102), the LIFs associated with each node, and indicate a status of each LIF. The status indication may include, for example, an administrative status and an operational status.

In one aspect, the monitoring and alert module 136 collects node information from nodes (108.1 . . . of FIG. 1A) and creates the aggregated node information data set 152. In one aspect, aggregated node information 152 provides an indication of the LIFs associated with each node and status indicators for those LIFs. Status indicators may, for example, include an administrative status and an operational status.

Figure 2:
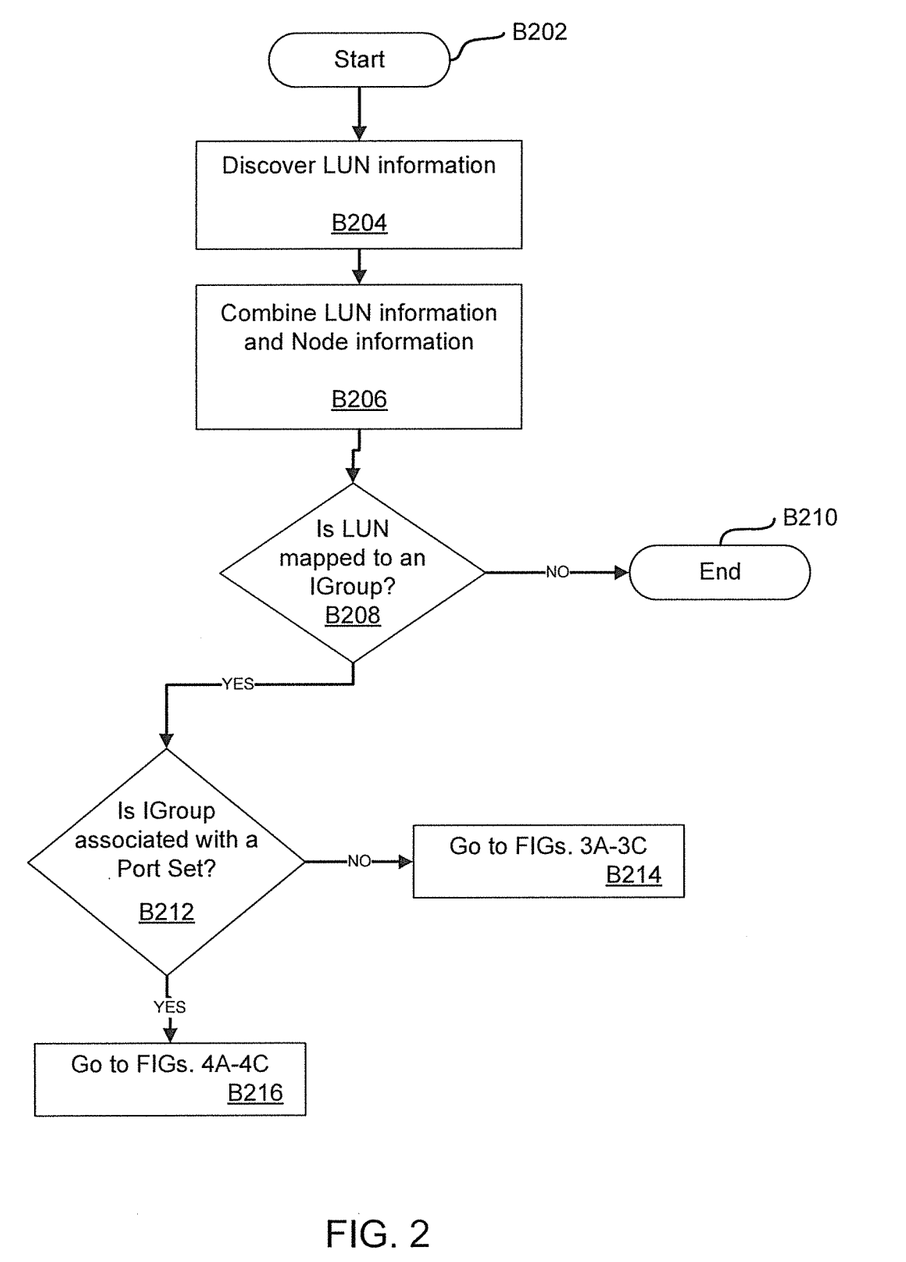
FIG. 2 shows a flow diagram for testing LUN setup, according to one aspect of the present disclosure.

Process Flow:

In storage systems, it is often important that system settings, including the LIF and LUN settings, allow the system to operate correctly and efficiently. FIG. 2 illustrates the start of a method to help users manage these systems. Starting at B202, the method begins when a storage operating system, a management application and clients are initialized and operational.

At block B204, LUN information is gathered. This may be handled, for example, by the discovery module 132 (FIG. 1B) obtaining LUN information 126 from storage operating system 306. LUN information may include information relating to one or more LUNs, for example, LUN identifiers, size of a LUN, permissions associated with the LUN and any other information.

At block B206, the LUN information is combined with other information, such as node information. In one aspect, this may include extracting relevant data from the LUN information 126 made available at the discovery module 132 and combining it with aggregated node information 152, which may be gathered from one or more nodes 108 by the discovery module 132.

In one aspect, the monitoring and alert module 136 extracts the relevant information for one target LUN; in another aspect, multiple target LUNs may be processed at once or in succession. Although the access information may vary in various aspects of the disclosure, LUN access information includes information regarding the LUN identity, associated IGroups, and associated port sets (if any).

At block 3208, the process determines if the LUN is mapped to an IGroup. If not, in one aspect, the LUN is considered inaccessible, and the process ends at block B210.

If there is an IGroup mapping, the process determines if there is a port set associated with the IGroup at block 3212. If there is no associated port set, the process continues to block 3214 and proceeds to the three process flows of FIGS. 3A-3C. If there is an associated port set, the process continues to block B216 and proceeds to the three process flows in FIGS. 4A-4C.

Figure 3A:
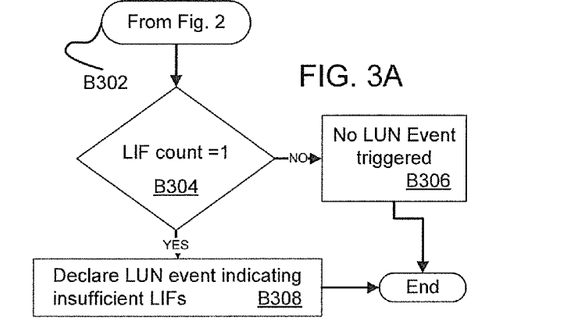
FIGS. 3A-3C illustrate continuations of the flow diagram of FIG. 2, where no port set is involved, according to one aspect of the present disclosure.
Figure 3B:
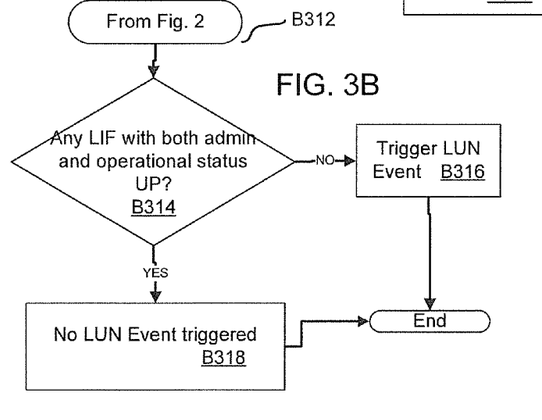
Figure 3C:
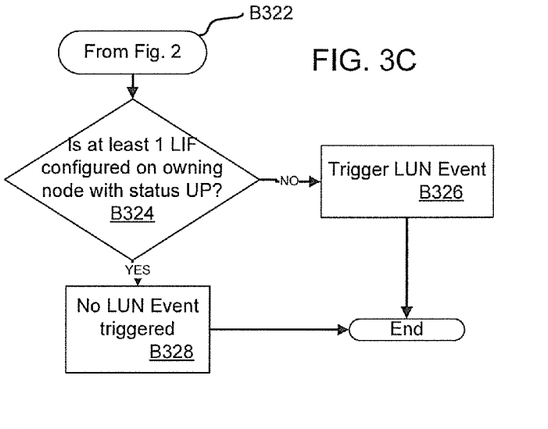

In different aspects, the processes shown in FIGS. 3A-3C (and similarly with respect to FIGS. 4A-4O) may be executed simultaneously (such as through threading using one or more available processors), concurrently, or some combination of the same. Moreover, in one aspect, the processes described with respect to FIGS. 3A-3C and 4A-4C may be executed individually, so that in one aspect, block B214 may only direct to FIG. 3B, for example. Similarly, other combinations will be understood by those of skill in the art.

Figure 4A:
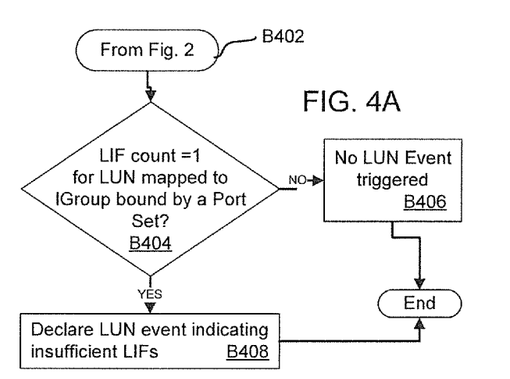
FIGS. 4A-4C illustrate continuations of the flow diagram of FIG. 2, where there is a port set, according to one aspect of the present disclosure.
Figure 4B:
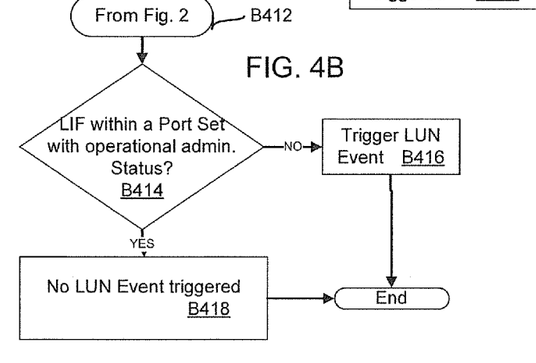
Figure 4C:
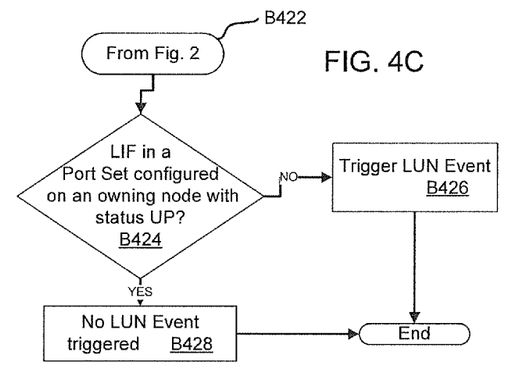

Upon completion of the process at B210, the processes of FIGS. 3A-3C, or the processes of FIGS. 4A-4C, the process of FIG. 2 may process information related to another LUN, starting with B206. In another aspect, the process may restart with block B204, where the discovery of LUN information may check for updates to information already gathered, for example. In one aspect, this process may repeat periodically, as system resources allow, and/or based on user initiation, for example. Similar processes will also be apparent to those of skill in the art from the disclosure herein.

As indicated, FIGS. 3A-3C are executed when the LUN's IGroup is not associated with a port set. Each process checks for LUN properties that may cause less than optimal operation to assist the management console user in optimizing LUN setups. In FIG. 3A, the process starts at block B302 coming from the process at FIG. 2 (block B214). At block B304, the process checks to see if the LIF count for the LUN's mapped IGroup equals one. In one aspect this is checked based on a protocol used by the IGroup, such as iSCSI, FCP, or mixed iSCSI/FCP. If not, either no LIFs are configured or multiple LIFs are configured, and no LUN event is triggered (block B306) and the process ends.

When the IGroup uses iSCSI, for example, the protocol may require that there are at least two LIFs configured for accessing a LUN. If the LIF count does equal one, then the protocol requirements are not met, and this triggers an event indicating that the configuration is defective as there are insufficient LIFs (block B308). In one aspect, this event may be represented as a flag in a settings box, as a pop-up, or as a warning box output to the GUI 139 (FIG. 1B), for example, or any of a variety of ways to alert a management application 121 user. In one aspect, for example, an email, a text message, or a voicemail may be triggered to be sent to a user. In this manner, a user may not need to be sitting at a terminal displaying the management application 121 to understand if an event arises.

The process of FIG. 3B starts at B312, coming from FIG. 2 (block B214). At block B314, the LUN information is checked to determine if there is at least one configured LIF for a given LUN where the LIF has both an administrative status and an operational status as UP. If there is one such LIF for a given LUN, then no event is triggered (block B318) and the process exits. On the other hand, if there is no LIF that meets that criteria for the LUN, then no active path to access the LUN for a given IGroup exists, and an alert to that effect is triggered (block B316). As set forth with respect to FIG. 3A, the event may be represented in a variety of ways, such as, for example, a flag in a settings box, a pop-up, or a warning box output to the GUI 139 (FIG. 1B), or any of a variety of other ways to alert a management application 121 user.

Similarly, the process of FIG. 3C is started at block B322, coming from FIG. 2 (block B214). At block B324, the process checks the configured and operational LIFs for a given LUN and IGroup to see if there is one such LIF that is associated with an owning node on which the LUN resides. If so, then there is an optimal path available to reach the LUN, and no event is triggered (block B328); the process ends. If no configured and operational LIF for a given LUN and IGroup exists in association with the owning node, then an event is triggered to indicate that there is no optimized path to access the LUN mapped to the given IGroup (block B326). The event can alert the management application 121 user as described above with respect to FIGS. 3A and 3B. The process then ends.

Similar processes exist for system configurations utilizing port sets, which are detailed in FIG. 4A-4C. In FIG. 4A, the process starts at block B402 coming from the process at FIG. 2 (block B216).

At block B404, the process checks to see if the LIF count for the LUN's mapped IGroup bound by a given port set equals one. In one aspect this is checked based on a protocol associated with the IGroup and port set, such as iSCSI, FCP, or mixed iSCSI/FCP. If not, either no LIFs are configured or multiple LIFs within the port set bound to the IGroup are configured, and no LUN event is triggered (block B406) and the process ends.

If the LIF count does equal one for the LUN mapped to the IGroup bound to the port set, then the protocol requirements are not met, and this triggers an event indicating that the configuration is defective as there is only a single active path, which is insufficient (block B408). In one aspect, this event may be represented as a flag in a settings box, as a pop-up, or as a warning box output to the GUI 139 (FIG. 1B), for example, or any of a variety of ways to alert a management application 121 user. In one aspect, for example, an email, a text message, or a voicemail may be triggered to be sent to a user. In this manner, a user may not need to be sitting at a terminal displaying the management application 121 to understand if an event arises.

In one aspect, the event may further indicate whether the IGroup or the port set is providing the improper constraint. For example, in one aspect, the monitoring and alert module 136 may determine that the port set does not include enough LIFs, but that if the port set did not limit the IGroup, then the IGroup would have access to sufficient LIFs to correct the issue. Alternatively, the monitoring and alert module 136 may determine that there are not enough LIFs associated with the given IGroup, regardless of the port set's contents. In such one aspect, the user may more clearly identify what issues need to be addressed to more optimally manage the storage system.

The process of FIG. 4B starts at 3412, coming from FIG. 2 (block B216). At block B414, the LUN information is checked to determine if there is at least one configured LIF, within the port set for a given LUN, where the LIF has both an admin status and an operational status as UP. If there is one such LIF for a given LUN, then no event is triggered (block B418) and the process exits. On the other hand, if there is no LIF that meets that criteria for the LUN, then no active path to access the LUN for a given IGroup exists, and an alert to that effect is triggered (block B416). As described with respect to FIG. 4A, the event may identify what aspect of the inquiry triggered the event. As set forth with respect to FIGS. 3A-3C and 4A, the event may be represented in a variety of ways, such as, for example, a flag in a settings box, a pop-up, or a warning box output to the GUI 139 (FIG. 1B), or any of a variety of other ways to alert a management application 121 user.

Similarly, the process of FIG. 4C is started at block B422, coming from FIG. 2 (block B216). At block B424, the process checks the configured and operational LIFs for a given LUN, IGroup, and port set to see if there is one such LIF that is associated with the node on which the LUN resides (also known as an "owning node"). If so, then there is an optimal path available to reach the LUN for the IGroup bound to the given port set, and no event is triggered (block B428); the process ends.

If no configured and operational LIF for a given LUN, IGroup, and port set exists in association with the owning node, then an event is triggered to indicate that there is no optimized path to access the LUN mapped to the given IGroup (block B426). The event can alert the management application 121 user as described above with respect to FIGS. 3A-3C and 4A-4B. The process then ends. As described with respect to FIG. 4A, the event may identify what aspect of the inquiry triggered the event.

One skilled in the art will understand that there are many ways to implement these processes over and above the examples described herein. For example, the processes of FIGS. 3B and 3C (or 4B and 4C) may be combined, as both include a LIF status check within the event trigger inquiry. Additionally, in an exemplary aspect, these processes may operate in an iterative manner until the access settings for all of a storage system's LUNs are checked. Iterations in one aspect may process in a LUN order, such as choosing LUN1 and checking all associated IGroups before moving to another LUN. Alternatively, iterations may be processed in an IGroup order, a port set order, a LIF order, or the like.

Additionally, in one aspect, user or system events may trigger one or more of the processes described. For example, if a new LUN, IGroup, port set, LIF, or the like is configured, the settings may be tested immediately. System events, such as a LIF status change, may also trigger a process described herein.

Figure 5:
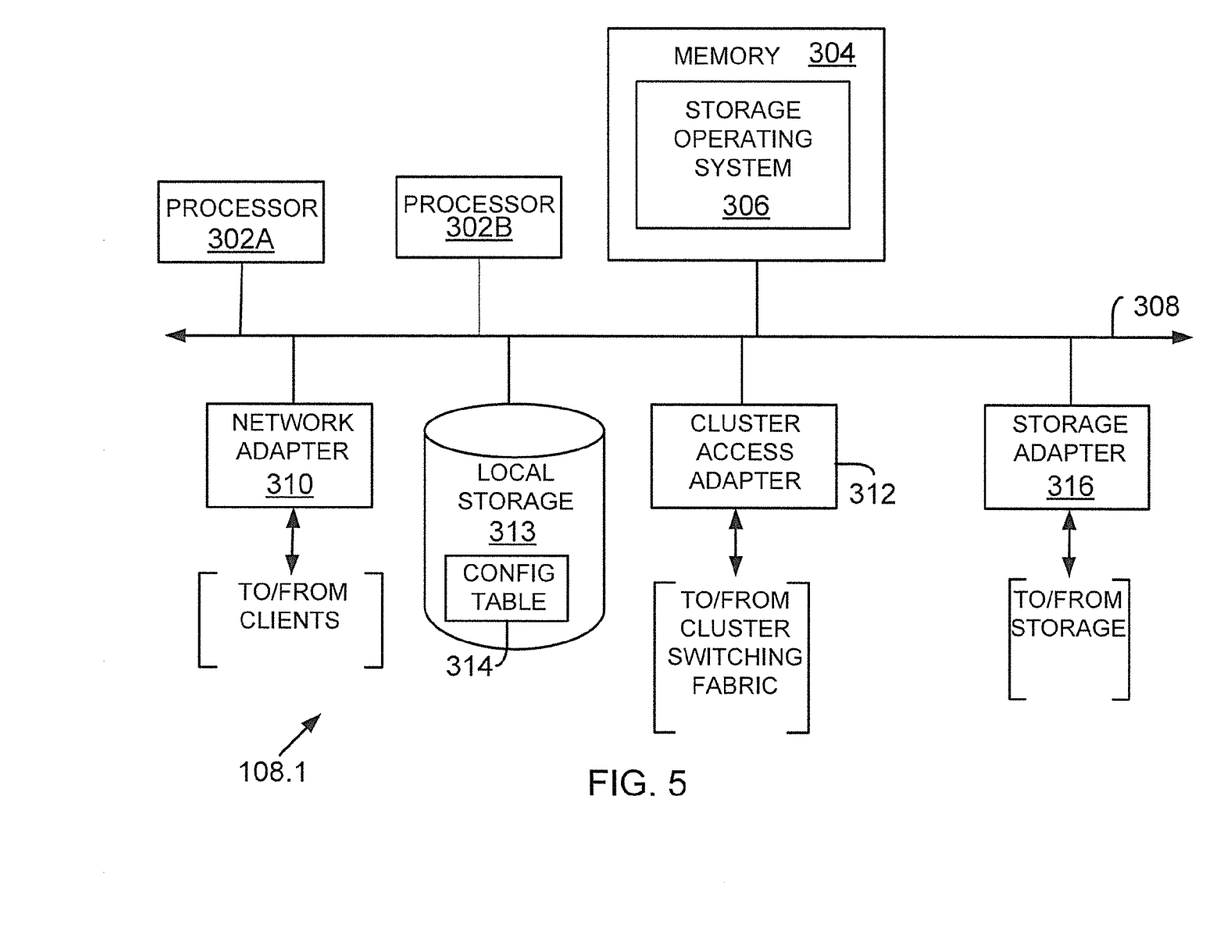
FIG. 5 is an example of a storage node used in the cluster of FIG. 1A, according to one aspect of the present disclosure.

Storage System Node:

FIG. 5 is a block diagram of node 108.1 that is illustratively embodied as a storage system comprising of a plurality of processors 302A and 302B, a memory 304, a network adapter 310, a cluster access adapter 312, a storage adapter 316 and local storage 313 interconnected by a system bus 308. Node 108.1 maintains LUN and node information data structures 126 and 127 described above.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314.

The cluster access adapter 312 comprises a plurality of ports adapted to couple node 108.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 100/101.

Node 108.1 is illustratively embodied as a dual processor storage system executing a storage operating system 306 that preferably implements a high-level module, such as a file system, to logically organize the information as a hierarchical structure of named directories and files on storage 112. However, it will be apparent to those of ordinary skill in the art that the node 108.1 may alternatively comprise a single or more than two processor systems. Illustratively, one processor 302A executes the functions of the N-module 114, M-module 118, while the other processor 302B executes the functions of the D-module 116. In another aspect, one processor executes the functions of M-module 118, while the other processor executes the functions of both D-module 116 and N-module 114. In yet another aspect, a dedicated processor (not shown) may be used to execute the functions of M-module 118.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the presented disclosure.

The storage operating system 306 portions of which is typically resident in memory and executed by the processing elements, functionally organizes the node 108.1 by, inter alia, invoking storage operation in support of the storage service implemented by the node.

The network adapter 310 comprises a plurality of ports adapted to couple the node 108.1 to one or more clients over point-to-point links, wide area networks, virtual private networks implemented over a public network (Internet) or a shared local area network. The network adapter 310 thus may comprise the mechanical, electrical and signaling circuitry needed to connect the node to the network.

The storage adapter 316 cooperates with the storage operating system 306 executing on the node 108.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 112. The storage adapter 316 comprises a plurality of ports having input/output (I/O) interface circuitry that couples to the storage devices over an I/O interconnect arrangement, such as a conventional high-performance, FC link topology.

Figure 6:
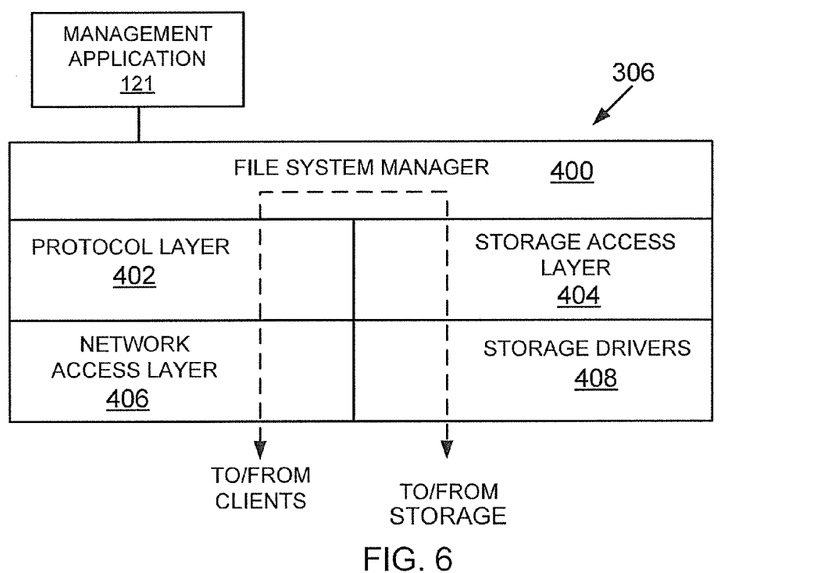
FIG. 6 shows an example of a storage operating system, used according to one aspect of the present disclosure.

Operating System:

FIG. 6 illustrates a generic example of storage operating system 306 executed by node 108.1, according to one aspect of the present disclosure. The storage operating system 306 interfaces with the management application 121 for providing LUN and node information as described above.

In one example, storage operating system 306 may include several modules, or "layers" executed by one or both of N-Module 114 and D-Module 116. These layers include a file system manager 400 that keeps track of a directory structure (hierarchy) of the data stored in storage devices and manages read/write operation, i.e. executes read/write operation on storage in response to client requests.

Storage operating system 306 may also include a protocol layer 402 and an associated network access layer 406, to allow node 108.1 to communicate over a network with other systems. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' and mass storage devices 112 are illustrated schematically as a path, which illustrates the flow of data through storage operating system 306.

The storage operating system 306 may also include a storage access layer 404 and an associated storage driver layer 408 to allow D-module 116 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information LUN, storage volume, aggregate and various storage devices.

As used herein, the term "storage operating system" generally refers to the computer-executable code operable on a computer to perform a storage function that manages data access and may, in the case of a node 108.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 7:
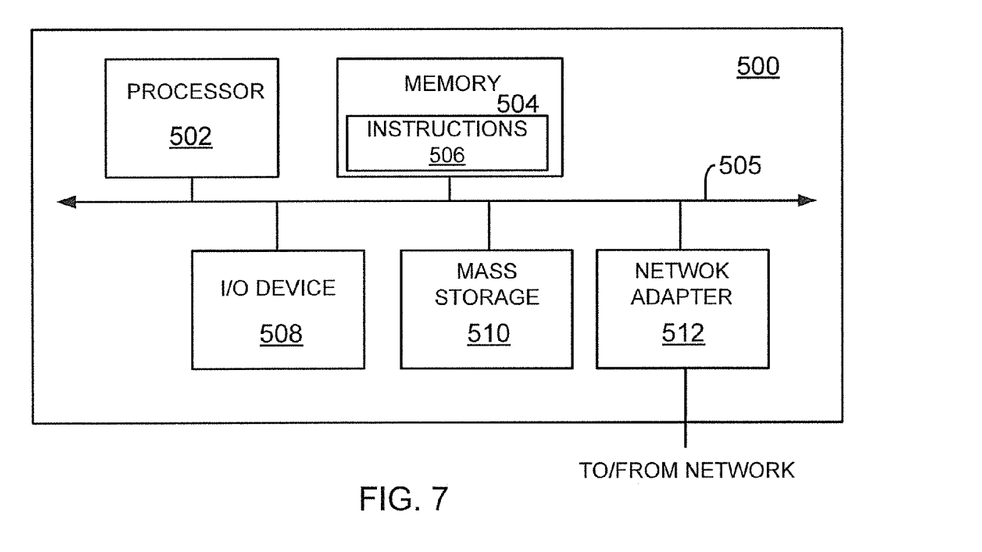
FIG. 7 shows an example of a processing system, used according to one aspect of the present disclosure.

Processing System:

FIG. 7 is a high-level block diagram showing an example of the architecture of a processing system 500 that may be used according to one aspect. The processing system 500 can represent the management console 122, a M-module 118, or client 104. Note that certain standard and well-known components which are not germane to the present disclosure are not shown in FIG. 7.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 that implement the process steps described above with respect to FIGS. 2B, 3A-3C, and 4A-4C may reside in and executed (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" means a network (for example, the Internet or any other network type) that enables providing computing as a service.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud specific services.

Thus, methods and systems for assisting storage system users in identifying and correcting storage access issues have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method comprising:
discovering Logical Unit Number (LUN) information from a storage system node, the LUN information associated with a first LUN and including an initiator group (IGroup) associated with the first LUN, wherein the IGroup identifies an initiator that can access the first LUN;
discovering node information including logical interface (LIF) status information; wherein a LIF is used by a client system to access the first LUN;
determining whether LUN access information also comprises a port set associated with the IGroup, wherein the port set limits access to the first LUN using a specific LIF;
combining the LIF status information and initiator information to test accessibility of the first LUN, when a port set is not associated to the at least one IGroup;
combining the LIF status information, the initiator information, and an LIF access list of the port set to test accessibility of the first LUN, when a port set is associated with the IGroup; and
triggering an event when accessibility of the first LUN is deficient.

2. The machine implemented method of claim 1 wherein:
the LIF information comprises administrative and operation status indications for each LIF; and
the accessibility of the first LUN is deficient when no LIF has both administrative and operation status indications that are positive and is accessible to the IGroup.

3. The machine implemented method of claim 2 wherein:
the LIF information further comprises information tying each LIF to an owning node; and
the accessibility of the first LUN is deficient when there is no LIF associated with a first node that has both administrative and operation status indications that are positive, wherein the first node also owns the first LUN.

4. The machine implemented method of claim 1 wherein only LIF elements of the LIF access list affect the accessibility of the first LUN.

5. The machine implemented method of claim 1 wherein the event comprises at least one of the following:
an alert to a graphical user interface (GUI);
an email alert; and
a text message alert.

6. The machine implemented method of claim 1 wherein the method repeats for each of a set of LUNs and associated IGroups.

7. The machine implemented method of claim 1 wherein the accessibility of the first LUN is deficient when the combined information indicates that the first LUN is accessible by only one LIF.

8. A non-transitory, machine readable storage medium having stored thereon instructions for performing a method, comprising machine executable code which when executed by at least one machine, causes the machine to:
discover Logical Unit Number (LUN) information from a storage system node, the LUN information associated with a first LUN and including an initiator group (IGroup) associated with the first LUN, wherein the IGroup identifies an initiator that can access the first LUN;
discover node information including logical interface (LIF) status information; wherein a LIF is used by a client system to access the first LUN;
determine whether LUN access information also comprises a port set associated with the IGroup, wherein the port set limits access to the first LUN using a specific LIF;
combine the LIF status information and initiator information to test accessibility of the first LUN, when a port set is not associated with the at least one IGroup;
combine the LIF status information, the initiator information, and an LIF access list of the port set to test accessibility of the first LUN, when a port set is associated with the IGroup; and
trigger an event when accessibility of the first LUN is deficient.

9. The machine readable storage medium of claim 8 wherein:
the LIF information comprises administrative and operation status indications for each LIF; and
the accessibility of the first LUN is deficient when no LIF has both administrative and operation status indications that are positive and is accessible to the IGroup.

10. The machine readable storage medium of claim 9 wherein:
the LIF information further comprises information tying each LIF to an owning node; and
the accessibility of the first LUN is deficient when there is no LIF associated with a first node that has both administrative and operation status indications that are positive, wherein the first node also owns the first LUN.

11. The machine readable storage medium of claim 8 wherein only LIF elements of the LIF access list affect the accessibility of the first LUN.

12. The machine readable storage medium of claim 8 wherein the event comprises at least one of the following:
an alert to a graphical user interface (GUI);
an email alert; and
a text message alert.

13. The machine readable storage medium of claim 8 wherein the method repeats for each of a set of LUNs and associated IGroups.

14. The machine readable storage medium of claim 8 wherein the accessibility of the first LUN is deficient when the combined information indicates that the first LUN is accessible by only one LIF.

15. A system comprising:
a memory containing machine readable medium comprising machine executable code having stored thereon instructions; and a processor module coupled to the memory, the processor module configured to execute the machine executable code to:
discover Logical Unit Number (LUN) information from a storage system node, the LUN information associated with a first LUN and including an initiator group (IGroup) associated with the first LUN, wherein the IGroup identifies an initiator that can access the first LUN;
discover node information including logical interface (LIF) status information; wherein a LIF is used by a client system to access the first LUN;
determine whether LUN access information also comprises a port set associated with the IGroup, wherein the port set limits access to the first LUN using a specific LIF;

combine the LIF status information and initiator information to test accessibility of the first LUN, when a port set is not associated with the at least one IGroup;

combine the LIF status information, the initiator information, and an LIF access list of the port set to test accessibility of the first LUN, when a port set is associated with the IGroup; and trigger an event when accessibility of the first LUN is deficient.

16. The system of claim 15 wherein:

the LIF information comprises administrative and operation status indications for each LIF; and the accessibility of the first LUN is deficient when no LIF has both administrative and operation status indications that are positive and is accessible to the IGroup.

17. The system of claim 16 wherein:

the LIF information further comprises information tying each LIF to an owning node; and the accessibility of the first LUN is deficient when there is no LIF associated with a first node that has both administrative and operation status indications that are positive, wherein the first node also owns the first LUN.

18. The system of claim 15 wherein only LIF elements of the LIF access list affect the accessibility of the first LUN.

19. The system of claim 15 wherein the event comprises at least one of the following:

an alert to a graphical user interface (GUI);

an email alert; and a text message alert.

20. The system of claim 15 wherein the method repeats for each of a set of LUNs and associated IGroups.

21. The system of claim 15 wherein the accessibility of the first LUN is deficient when the combined information indicates that the first LUN is accessible by only one LIF.

* * * * *